(12) United States Patent
Kalkert (10) Patent No.: US 12,339,172 B2
(45) Date of Patent: Jun. 24, 2025

(54) DEVICE FOR ACOUSTIC TEMPERATURE MEASUREMENT

(71) Applicant: KIMA PROCESS CONTROL GMBH, Jülich (DE)

(72) Inventor: Peter Kalkert, Jülich (DE)

(73) Assignee: KIMA PROCESS CONTROL GMBH, Jülich (DE)

( * ) Notice: Subject to any disclaimer, the term of this patent is extended or adjusted under 35 U.S.C. 154(b) by 420 days.

(21) Appl. No.: 17/786,029

(22) PCT Filed: Dec. 11, 2020

(86) PCT No.: PCT/EP2020/085688
§ 371 (c)(1),
(2) Date: Jun. 16, 2022

(87) PCT Pub. No.: WO2021/122353
PCT Pub. Date: Jun. 24, 2021

(65) Prior Publication Data
US 2023/0358619 A1 Nov. 9, 2023

(30) Foreign Application Priority Data

Dec. 18, 2019 (EP) .................................... 19217306

(51) Int. Cl.
*G01K 11/24* (2006.01)
*G01K 13/024* (2021.01)
(Continued)

(52) U.S. Cl.
CPC ............ *G01K 11/24* (2013.01); *G01K 13/024* (2021.01); *G01N 29/024* (2013.01);
(Continued)

(58) Field of Classification Search
CPC .... G01K 11/24; G01K 13/024; G01N 29/024; G01N 29/221; G01N 29/223;
(Continued)

(56) References Cited

U.S. PATENT DOCUMENTS 4,762,425 A * 8/1988 Shakkottai ............. G01K 11/24
367/902
4,810,100 A * 3/1989 Shavit .................... G01K 17/16
374/117

(Continued)

FOREIGN PATENT DOCUMENTS

| JP | H02176434 A | 7/1990 |
|---|---|---|
| JP | H0560622 A | 3/1993 |

(Continued)

OTHER PUBLICATIONS

Computer translation of JP 3-130975 downloaded from the JPO website on Sep. 30, 2024.*

(Continued)

*Primary Examiner* — Randy W Gibson
(74) *Attorney, Agent, or Firm* — Tarolli, Sundheim, Covell & Tummino LLP (57) ABSTRACT

The invention relates to a device (1) at least for an acoustic temperature measurement in a gaseous medium (M) passing a medium channel (110) by means of runtime measurement of an acoustic pulse (AP) running through the gaseous medium (M) from at least a first transmitter arrangement (TA1) to at least a first receiver arrangement (RA1), the first transmitter arrangement (TA1) comprising a sound pulse generator (2) for the generating the acoustic pulse (AP), which is connected by a first acoustic channel (3) to a transmitter (4) which transmits the acoustic pulse (AP) into the medium (M), the first acoustic channel (3) being of (Continued)

acoustically dispersive design, and, the first receiver arrangement (RA1) comprising a receiver (5) for receiving the acoustic pulse (AP) after it has passed through the medium (M) and for transmitting it via a second acoustic channel (6) to a first microphone (7), preferably a piezoelectric microphone (7), for detecting the acoustic pulse (AP), the first acoustic channel (3) being curved towards the sound pulse generator (2) in such a way that the radiant heat of the medium (M) on the sound pulse generator (2) is at least greatly reduced, wherein at least the transmitter (4) comprises in the first acoustic channel (3) on its side (41) facing the medium (M) to be measured interfering element (42) which reflects a part (RI) of the acoustic pulse (AP) back into the first acoustic channel (3) of the first transmitter arrangement (TA1), in which a second microphone (8), preferably arranged on the side (43) of the transmitter (4) feeing the sound pulse generator (2), is arranged for detecting the back-reflected part (RI) of the acoustic pulse (AP), the device (1) further comprising a pulse discriminator (9) designed to determine the arrival times (AT) of the recorded acoustic pulses (AP) in a suitable way and to transmit them to an evaluation unit (10) designed to determine the temperature of the medium (M) from the runtime of the acoustic pulse (AP) from the transmitter (4) to the receiver (5), taking into account the arrival times (AT) determined by the pulse discriminator and the acoustic pulses (RI, AI) detected by first and second microphones (7,8).

15 Claims, 7 Drawing Sheets (51) Int. Cl.
    *G01N 29/024*    (2006.01)
    *G01N 29/22*    (2006.01)
    *G01N 29/24*    (2006.01)
    *G01N 29/32*    (2006.01)
    *G01N 29/34*    (2006.01)
    *G01N 29/44*    (2006.01)

(52) U.S. Cl.
CPC ......... *G01N 29/221* (2013.01); *G01N 29/223* (2013.01); *G01N 29/2437* (2013.01); *G01N 29/326* (2013.01); *G01N 29/343* (2013.01); *G01N 29/4436* (2013.01); *G01N 2291/011* (2013.01); *G01N 2291/02881* (2013.01)

(58) Field of Classification Search
CPC ............ G01N 29/2437; G01N 29/326; G01N 29/343; G01N 29/4436; G01N 2291/011; G01N 2291/02881
See application file for complete search history.

(56) References Cited

U.S. PATENT DOCUMENTS

| | | | | |
|---|---|---|---|---|
| 4,882,931 | A * | 11/1989 | Breeuwer | G01P 5/245 73/170.13 |
| 5,040,415 | A * | 8/1991 | Barkhoudarian | G01P 5/24 73/861.03 |
| 5,349,859 | A * | 9/1994 | Kleppe | G01N 29/024 374/119 |
| 5,546,813 | A * | 8/1996 | Hastings | G01P 5/245 73/861.29 |
| 5,597,962 | A * | 1/1997 | Hastings | G01F 1/668 73/861.28 |
| 5,624,188 | A * | 4/1997 | West | G01K 11/24 374/119 |
| 6,786,633 | B2 * | 9/2004 | Wallen | G01K 11/24 73/645 |
| 9,702,768 | B2 * | 7/2017 | Claussen | G01K 11/24 |
| 10,145,616 | B2 * | 12/2018 | Schürmann | F27B 7/2025 |
| 10,612,949 | B2 * | 4/2020 | Haffner | G01F 1/668 |
| 11,994,532 | B2 * | 5/2024 | Arens | G01P 13/04 |

FOREIGN PATENT DOCUMENTS

| | | | |
|---|---|---|---|
| JP | H09166503 | A | 6/1997 |
| JP | 3130975 | B2 | 1/2001 |
| JP | 3 574522 | B2 | 10/2004 |

OTHER PUBLICATIONS

Omputer translation of JP 3-574522 downloaded from the JPO website on Sep. 30, 2024.*
Kychakoff, G et al: "Use of acoustic temperature measurements in the cement manufacturing pyroprocess", Cement Industry Technical Conference, 2005. Conference Record Kansas City, MO, USA May 15-20, 2005, Piscataway, NJ, USA, IEEE, May 15, 2005 (May 15, 2005), pp. 23-33, XP010840063, DOI: 10.1109/CITCON.2005. 1516350 ISBN: 978-0-7803-9107-9, abstract.
International Search Report and Written Opinion issued in connection with corresponding PCT Application No. PCT/EP2020/085688 dated Feb. 8, 2021.
JP Office Action for corresponding JP Patent Application No. 2022-532062, dated Aug. 6, 2024, 24 pages.

* cited by examiner

DEVICE FOR ACOUSTIC TEMPERATURE MEASUREMENT

RELATED APPLICATIONS

The present invention is a U.S. National Stage under 35 USC 371 patent application, claiming priority to Serial No. PCT/EP2020/085688, filed on Dec. 11, 2020, which claims priority from European Patent Application No. 19217306.0 filed on Dec. 18, 2019; the entireties of both are hereby incorporated herein by reference.

SUBJECT OF THE INVENTION

The invention relates to a device for acoustic temperature measurements, to an installation for cement production or other production using or containing hot gases comprising such device and to a method for operating such device.

BACKGROUND OF THE INVENTION

Cement is the most important aggregate for the production of concrete, by far the most common building material today. Cement production is based on various chemical reactions at very high temperatures. Various measuring techniques are used today for process optimization and for monitoring the operating conditions and emission behavior of the plants. The chemical analysis of the process gas for its composition at the individual stages of the manufacturing process provides very important information about the combustion process and the use of fuel, among other things, in order to optimize the use of energy, to improve or maintain the required product quality, to extend the service life and availability of the plants and to reduce maintenance costs. In addition to these aspects, environmental protection plays a central role in cement production. In concrete terms, this means that the cement industry and the developers and manufacturers of process analytics for the cement industry must face the problems of (a) reducing $CO_2$ emissions, (b) reducing energy consumption in the operation of rotary kilns and (c) stabilizing process control and regulation, among other things when using primary or secondary fuels. This requires a high measurement reliability, accuracy and repeatability of the process parameters during the cement manufacturing process. One of the most important process parameters is the gas temperature in the cement kilns and related equipment. Since such temperatures can amount up to 1800° C. depending upon location in the cement kiln, very high requirements are placed on the temperature stability of the measuring equipment and its accuracy, in particular, since for cement kilns this measurement must be accomplished in besides usually a dust and dirt-laden environments reliably. Until now, temperature measurement has generally been carried out with the aid of thermocouples which are pushed into the gas flow of the medium to be measured. In order to carry out the measurement, the thermocouples must be brought into thermal equilibrium with the gas flow. This is only possible if the gas flow is not too turbulent and there are no heat sources or heat sinks in the vicinity that would falsify the measurement result due to thermal radiation. Due to the high exposure to abrasive dusts, the thermocouples must be used in thick steel or ceramics armored tubes. As a result, the reaction speed of these temperature measuring points drops considerably in the range of a few minutes to quarters of an hour. Since a meaningful gas temperature does not have to be measured near the wall, but deeper in the respective medium, these armored pipes have to be pushed far into the gas stream. Thus they wear out fast and must be replaced within weeks. Moreover temperature measurement by means of thermocouples is a punctual measurement, while in most cases of the big machinery being used in cement production the average temperature along a path or a volume is required.

Acoustic sound pyrometry has been used for a long time in the power plant sector, whereby an artificially generated noise signal generated by compressed air is used to determine the propagation time, which is measured at the transmitter and receiver to determine the propagation time between transmitter and receiver by cross correlation of these signals. The reliable calculation requires relatively long measurement cycles. Since the compressed air consumption of the sound transmitters is very high, the method has never been used in the cement industry because of the high costs involved. In addition, the compressed air injected in large quantities in the cement process disturbs the process as "false air", whereas in power plants this accounts for a comparatively small proportion of the combustion air and is easy to tolerate. A sufficiently fast, accurate and reliable measurement of the gas temperature in the cement sector is not available. In addition, there is no measuring system that can measure not only the temperature but also the enthalpy of the gas.

It would therefore be desirable to have a robust and durable device available at least for temperature measurement, by which a temperature measurement of up to 2,000° C. can be carried out reliably, robustly, very quickly and largely independent of interfering influences such as dust and dirt in the running production process.

SUMMARY OF THE INVENTION

It is an object of the invention to provide a robust and durable device at least for temperature measurement, by which a temperature measurement of up to 2,000° C. can be carried out very quickly in the running production process reliably, robustly and largely independent of interfering influences such as dust and dirt.

The object is solved by a device at least for an acoustic temperature measurement in a gaseous medium passing a medium channel by means of runtime measurement of an acoustic pulse running through the gaseous medium from at least a first transmitter arrangement to at least a first receiver arrangement, the first transmitter arrangement comprising a sound pulse generator for generating the acoustic pulse, which is connected by a first acoustic channel to a transmitter which transmits the acoustic pulse into the medium, the first acoustic channel being of acoustically dispersive design, and, the first receiver arrangement comprising a receiver for receiving the acoustic pulse after it has passed through the medium and for transmitting it via a second acoustic channel to a first microphone, preferably a piezoelectric microphone, for detecting the acoustic pulse, the first acoustic channel being curved towards the sound pulse generator in such a way that the radiant heat of the medium on the sound pulse generator is at least greatly reduced, wherein at least the transmitter comprises on its side facing the medium to be measured an interfering element which reflects a part of the acoustic pulse back to the first acoustic channel of the first transmitter arrangement, in which a second microphone, preferably arranged on the side of the transmitter facing the sound pulse generator, is arranged for detecting the back-reflected part of the acoustic pulse, the device further comprising a pulse discriminator designed to determine the arrival times of the recorded acoustic pulses in a suitable way and to transmit them to an evaluation unit designed to determine the temperature of the medium from the runtime of the acoustic pulse from the transmitter to the receiver, taking into account the arrival times determined by the pulse discriminator and the acoustic pulses detected by first and second microphones.

Gas temperature measurement according is based on the fact that the speed of sound in gases over wide limits is only a function of temperature but not of pressure. The temperature of a gas can therefore be determined by measuring the speed of sound. For a given gas composition the specific gas constant and the isentropic exponent are fixed. The speed of sound therefore depends only on the temperature. Thus, by measuring the speed of sound in a gas, the information about the gas temperature is obtained, whereby the measurement is independent of the gas pressure and gas density.

The process gases in the cement industry are mainly air or combustion exhaust gases and have high temperatures, but a low heat capacity. In order to measure the temperature of a gas with an armored thermocouple, it is necessary to wait until the sensor is in thermal equilibrium with the medium; this usually takes several reaction times. Since the air in the intended applications is additionally contaminated with abrasive dust, the thermocouples in the cement industry are even more heavily armored, which further extends the reaction time. Experience has shown that temperature sensors in the cement industry have reaction times of a few minutes up to 15 minutes. Cement clinker dust is very abrasive and customers specify a service life of between two and eight weeks for steel-plated thermocouples used in the heat exchanger tower and clinker cooler. Due to the acoustic measuring technology used, the device according to the present invention is located outside the zone of the flowing gases and is therefore not affected by the gas flow, which enables service life cycles of at least the inspection interval (approx. one year).

In contrast, the device in accordance with the invention will not extend beyond the refractory insulation material to the gas flow and will additionally be purged with air, so that the entire device is mechanically and thermally much less stressed. The measuring zone corresponds to the entire path traversed by the acoustic pulse. The mean value of the temperature over the path length is obtained. For control systems that work with energies/enthalpies of the gas flow, such a measurement is a much more reliable signal.

The medium might be any gas with any composition. The medium channel denotes any channel, volume, installation, where the medium passes through. As an example the medium channel might be pipe, a preheater unit, a gas inlet, a kiln, a chimney or anything else where gaseous medium may flow through. An acoustic channel is a hollow connection between the sound pulse generator and transmitter output, and between the receiver input and microphone, which is passed by acoustic waves. The acoustic channels can have any shape and cross section geometry suitable for the measurement.

The curved first acoustic channel prevents heat radiation from the medium to be measured from falling on the sound pulse generator, which protects it from the hot temperatures of the medium, for example in cement kilns with up to 2,000° C., since the acoustic connection via the transmitter represents an open channel to the medium.

The temperature in the transmitter and receiver is not known due to their direct contact with the hot medium to be measured, nor is the temperature distribution from the transmitter output to the medium along the acoustic channel in the direction of the sound pulse generator. This results in an unknown disturbance that could considerably falsify the measurement result. The said interfering element makes it possible to measure the temperature in the transmitter section and correct the runtime signal accordingly. Such an arrangement can also be arranged on the receiver side. For the sake of simplicity, however, it can also be assumed that the interference in the receiver is of the same magnitude and that the correction signal from the transmitter side can also be used on the receiver side when calculating the temperature.

Piezoelectric microphones are not very temperature-sensitive and are therefore suitable as first and second microphones. They are therefore more robust and cost-effective. Possible deficits in the sensitivity and speed of these microphones can be compensated with appropriately designed input amplifiers.

Therefore the device according to the present invention is a robust and durable device enabling temperature measurements of up to 2,000° C., which can be carried out very quickly in the running production process reliably, robustly and largely independent of interfering influences such as dust and dirt. For example, in gases of 1450° C. a measurement accuracy of down to 1K can be achieved corresponding to an accuracy of the runtime measurement of less than 2 µs. The distance between transmitter and receiver might be 1 to 10 meters.

In an embodiment at least the first acoustic channel, preferably also the second acoustic channel, is cooled from the outside by means of a cooling device. This prevents the heating of the gas in the supply line, which reduces the run time of the acoustic pulse in the medium to be measured. This also protects the sound generator from heat radiation and damage. The same applies to the components on the receiver side, especially the first microphone.

In another embodiment the transmitter and receiver are designed as funnels which open linearly, exponentially or by any appropriate function in the direction of the medium. This ensures a good coupling of the sound pulse generator to the measuring section between transmitter and receiver.

In another embodiment the sound pulse generator comprises a correspondingly controlled conductive and elastic metal diaphragm for generating the acoustic pulse or is designed as a pressure chamber loudspeaker or another device to produce short high pressure pulses. A metallic diaphragm is particularly robust against high temperatures, which do not have the measuring temperature in the medium at the location of the diaphragm, but are nevertheless considerable. To generate a strong acoustic pulse, a conductive, elastic membrane as the metallic diaphragm is stretched in front of a low-impedance coil. If a short current pulse is sent through the coil, eddy currents are induced in the membrane by induction, which lead to a pulse-like repulsion of the membrane. If the membrane is allowed to work on a pressure chamber, a precisely defined, strong acoustic pulse results. In order to achieve the best possible acoustic coupling of the sound pulse generator to the measuring section, usually a linear, exponentially or by any appropriate function opening funnel is used.

In another embodiment the first microphone comprises a microphone amplifier and the pulse discriminator. This allows the arrival time of the acoustic pulse to be measured with high accuracy. A fast microcontroller (ARM) can be used as pulse discriminator. This makes it possible to adapt the response threshold to the pulse shape and achieve a high time resolution in the range of sub-milliseconds.

In another embodiment in the second acoustic channel a temperature protection diaphragm is arranged in front of the first microphone in the direction of a running direction of the acoustic pulse. This allows temperature-sensitive microphones to be protected from the hot medium, which is what makes the use of particularly temperature-sensitive microphones possible in the first place.

In another embodiment the second microphone is arranged outside the transmitter and is connected to a wall of the transmitter by means of an acoustic supply line for detection of the back-reflected part of the acoustic pulse. Due to the arrangement of the second microphone outside the transmitter, the transmitter does not disturb the transmission of the acoustic pulse by shading effects and is furthermore protected by the narrow supply line from an excessively high temperature effect of the medium in the transmitter.

In another embodiment the pulse discriminator is adapted to use a zero crossing of the acoustic pulse as a trigger time for the arrival time of the acoustic pulse. The acoustic pulse has a waveform in which the signal is initially below an average amplitude, then rises sharply and falls below the average amplitude again on the falling edge of the pulse. If the average amplitude is set as the zero line, the waveform of the acoustic pulse has two zero crossings, before and after the maximum of the acoustic pulse. These zero crossings also can be used as trigger.

In another embodiment the interfering element is configured as a ring or an appropriate shape around the output of the transmitter. Thereby the back-reflected signal becomes stronger than in the case of a single interference element which is only locally present. In addition, the influence of the interference ring on the acoustic pulse is symmetrical.

In another embodiment the first transmitter arrangement and the first receiver arrangement are arranged on opposite sides of a path of interest through the medium channel or of the medium channel. This provides the shortest distance providing the shortest possible runtime between the sender and the receiver increasing the measurement accuracy for the determined temperature.

In another embodiment the device comprises at least a second transmitter arrangement comprising the same components as the first transmitter arrangement, where first and second transmitter arrangements are arranged on the same side of the medium channel at different heights with respect to a direction of flow of the gaseous medium, where one of the first and second transmitter arrangements are arranged above the first receiver arrangement and the other is arranged below the first receiver arrangement with respect to the direction of flow of the gaseous medium, where both transmitter arrangements are adapted to transmit their acoustic pulses towards the receiver at different times in order to provide acoustic pulses with runtimes in one direction partly against and in the other direction partly along the direction of flow of the gaseous medium. Since the transmitter arrangements are arranged at different heights with respect to the receiver arrangement, for one of the transmitter arrangements the measured runtime of the acoustic pulse comprises a slowing down contribution, since the pulse runs partly against the flow of the gaseous medium, while for the other transmitter arrangement, the runtime of the acoustic pulse comprises an accelerating contribution, since the pulse runs partly with the flow of the gaseous medium. From the difference of both detected runtimes, one can calculate the average speed of flow of the gaseous medium through the medium channel. Using the known cross section of the channel, the volume flow can be calculated.

In another embodiment the device comprises at least a second receiver arrangement comprising the same components as the first receiver arrangement, where first and second receiver arrangements are arranged on the same side of the medium channel at different heights with respect to the direction of flow of the gaseous medium, where one of the first and second receiver arrangements are arranged above the first transmitter arrangement and the other is arranged below the first receiver arrangement with respect to the direction of flow of the gaseous medium, where both receiver arrangements are adapted to receive the acoustic pulse from the transmitter at different times, where the transmitter is adapted to transmit the acoustic pulses to the first and/or second receiver arrangement in order to provide acoustic pulses with runtimes in one direction partly against and in the other direction partly along the direction of flow of the gaseous medium, where the transmitter is adapted to transmit the acoustic pulses either to the first or second receiver arrangement.

In another alternative embodiment the first transmitter arrangement is adapted to be operated on demand as a second receiver arrangement comprising the same components as the first receiver arrangement required to also receive the acoustic pulse and that the first receiver arrangement is adapted to be operated on demand as a second transmitter arrangement comprising the same components as the first transmitter arrangement required to also transmit the acoustic pulse, where the first transmitter and receiver arrangement are arranged on different heights with respect to the direction of flow of the gaseous medium, where the first transmitter arrangement is adapted to transmit acoustic pulses at different times than the second transmitter arrangements in order to provide acoustic pulses with runtimes in one direction partly against and in the other direction partly along the direction of flow of the gaseous medium. Here a part on the components of the transmitter side can also be used for receiving the acoustic pulses from the receiver side also acting as a transmitter side enabling to provide a device enabling the determination of the gas volume flow with less effort and components as in the embodiments described before.

The embodiments, where transmitter and receiver are arranged at different height ((a) two transmitters and one receiver, (b) one transmitter and two receivers or (c) two transmitter/receiver arrangements, all installed at different heights with respect to each other and the flow direction of the gaseous medium), enable the measurement of the volume gas flow and the enthalpy of the medium. From precise temperature measurement and the simultaneously measured flow velocity, the volume flow per time unit in the measuring section is determined for a known cross-section of the measuring section and finally the enthalpy of the flowing gas is calculated by the device according to the present invention.

The invention further relates to an installation for cement production comprising at least one device according to the present invention. Because of their size, cement kilns of installations for cement production have to run around the clock. They are usually only shut down for annual inspections or in the event of serious malfunctions. Start-up and shut-down procedures usually take several days and are therefore avoided as far as possible. The temperature and enthalpy measuring device according to the present invention is to be used as a reference variable. It must therefore achieve at least the same service life as the furnace, which is fulfilled by the device according to the present invention.

The invention further relates to a method to operate a device according to the present invention at least for an acoustic temperature measurement in a gaseous medium passing a medium channel by means of runtime measurement of an acoustic pulse running through the gaseous medium from at least a first transmitter arrangement arranged on one side of a medium channel to at least a first receiver arrangement arranged on another side of the medium channel, comprising steps of:
  generating the acoustic pulse by a sound pulse generator;
  transmitting the acoustic pulse via a connected first acoustic channel to a transmitter, which transmits the acoustic pulse into the medium, where the first acoustic channel being of acoustically dispersive design and being curved towards the sound pulse generator in such a way that the radiant heat of the medium on the sound pulse generator is at least greatly reduced;
  detecting a back-reflected part of the acoustic pulse by a second microphone arranged in the first transmitter arrangement, preferably arranged on the side of the transmitter facing the sound pulse generator, wherein at least the transmitter comprises on its side facing the medium to be measured an interfering element to reflect back the part of the acoustic pulse to the first acoustic channel;
  receiving the acoustic pulse after having passed the medium by a receiver;
  transmitting the acoustic pulse via a second acoustic channel to a first microphone, preferably a piezoelectric microphone, to detect the acoustic pulse;
  determining an arrival time of the recorded acoustic pulses by a pulse discriminator in a suitable way and transmitting them to an evaluation unit;
  determining the temperature of the medium from the runtime of the acoustic pulse from the transmitter to the receiver by the evaluation unit taking into account the arrival times determined by the pulse discriminator and the acoustic pulses detected by first and second microphones.
  determining the runtime inside of the transmitter and receiver by means of measurement of the runtime of the back reflected part of the pulse by the interfering elements at the output of the transmitter.
  In an embodiment of the method the device comprises
  at least a second transmitter arrangement comprising the same components as the first transmitter arrangement, where first and second transmitter arrangements are arranged on the same side of the medium channel at different heights with respect to a direction of flow of the gaseous medium, where one of the first and second transmitter arrangements is arranged above the first receiver arrangement and the other is arranged below the first receiver arrangement with respect to the direction of flow of the gaseous medium, comprising the step of generating and transmitting acoustic pulses towards the receiver at different times by both transmitter arrangements;
  and/or
  at least a second receiver arrangement comprising the same components as the first receiver arrangement, where first and second receiver arrangements are arranged on the same side of the medium channel at different heights with respect to the direction of flow of the gaseous medium, where one of the first and second receiver arrangements are arranged above the first transmitter arrangement and the other is arranged below the first receiver arrangement with respect to the direction of flow of the gaseous medium comprising the steps of generating transmitting the acoustic pulses by the transmitter either to the first or second receiver arrangement and receiving the acoustic pulse from the transmitter at different times by both receiver arrangements;
  and/or
  the first transmitter arrangement is adapted to be operated on demand as a second receiver arrangement comprising the same components as the first receiver arrangement required to also receive the acoustic pulse and that the first receiver arrangement is adapted to be operated on demand as a second transmitter arrangement comprising the same components as the first transmitter arrangement required to also transmit the acoustic pulse, where the first transmitter and receiver arrangement are arranged on different heights with respect to the direction of flow of the gaseous medium, comprising the step of generating and transmitting acoustic pulses from both transmitters to both receivers at different times;
  and
  calculating a volume flow of the gaseous medium through the medium channel from a difference of both detected runtimes one partly against and one partly along the direction of flow of the gaseous medium by the evaluation unit;
  preferably followed by calculating a gas enthalpy from the temperature and volume flow by the evaluation unit.

The above described embodiments can be used individually or in any combination with each other, even in deviation from the back references of the dependent claims to each other stated in the claims.

BRIEF DESCRIPTION OF THE DRAWINGS

These and other aspects of the invention are illustrated in detail in the following drawings.

DETAILED DESCRIPTION OF EMBODIMENTS

Figure 1:
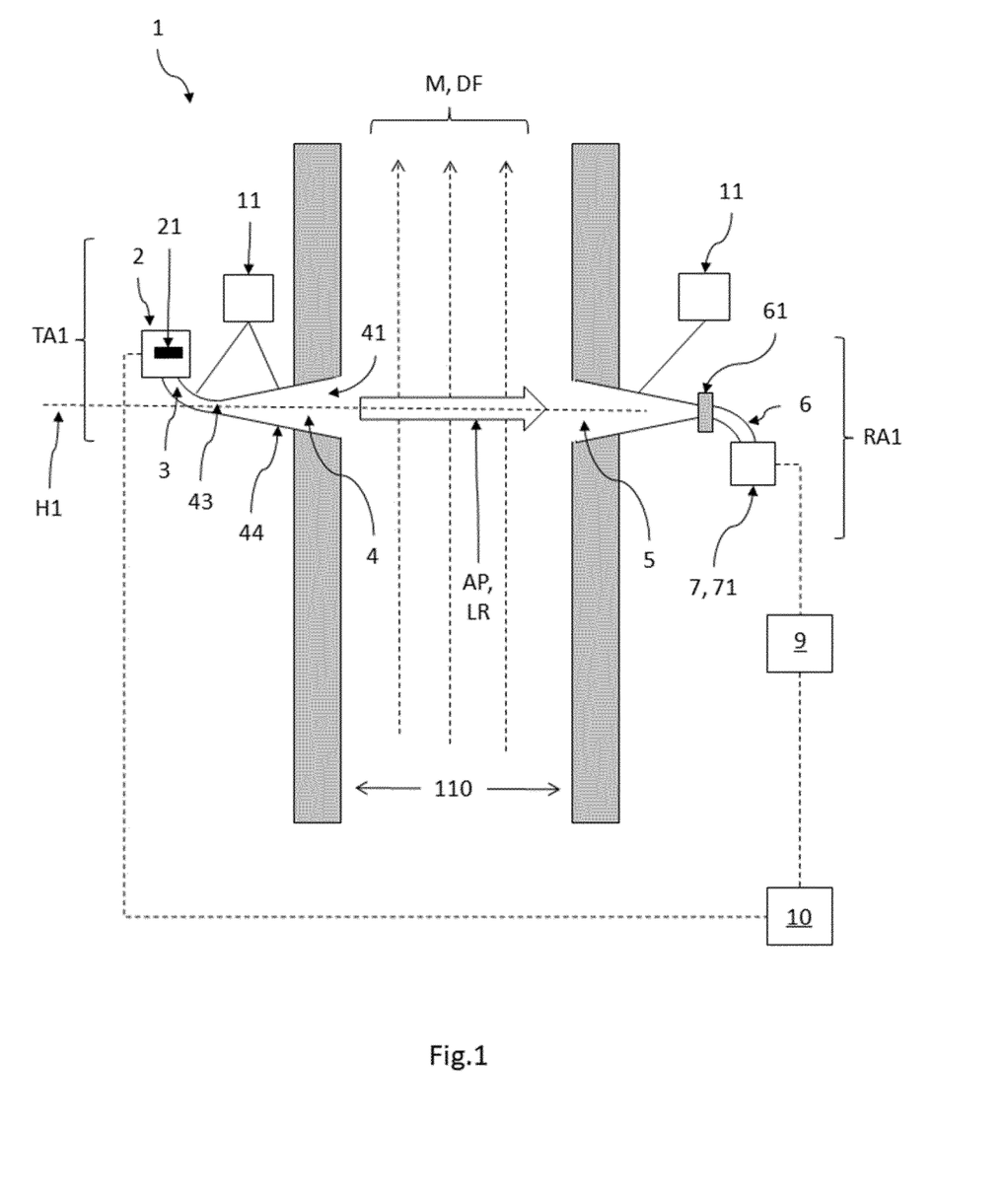
FIG. 1: schematic side view of an embodiment of a device for acoustic temperature measurement according to the present invention installed in an installation for cement production.

FIG. 1 shows a schematic side view of an embodiment of a device 1 for acoustic temperature measurement according to the present invention in a gaseous medium M passing a medium channel 110 of an installation 100 (see FIG. 6) for cement production by means of runtime measurement of an acoustic pulse AP running through the gaseous medium M from a first transmitter arrangement TA1 to a first receiver arrangement RA1, where the runtime is an average value over the distance between the first transmitter arrangement TA1 and the first receiver arrangement RA1 of for example one or more meters. The response time is below 1 second, the measurement accuracy about 1% or less of the total runtime. The first transmitter arrangement TA1 of the device 1 comprises a sound pulse generator 2 for generating the acoustic pulse AP, which is connected by a first acoustic channel 3 to a transmitter 4 which transmits the acoustic pulse AP into the medium M, the first acoustic channel 3 being of acoustically dispersive design. The sound pulse generator 2 comprises a correspondingly controlled conductive and elastic metal diaphragm 21 for generating the acoustic pulse AP or is designed as a pressure chamber loudspeaker or other devices being able to produce short high pressure pulses. The first receiver arrangement RA1 of the device 1 comprises a receiver 5 for receiving the acoustic pulse AP after it has passed through the medium M and for transmitting it via a second acoustic channel 6 to a first microphone 7, preferably a piezoelectric microphone 7, for detecting the acoustic pulse AP. The first transmitter arrangement TA1 and the first receiver arrangement RA1 are arranged on opposite sides of the medium channel 110 achieving a minimum distance between both components in order to decrease the runtime resulting in improved relative measurement accuracy for the runtime. Here the transmitter 4 and receiver 5 are designed as funnels which open linearly, exponentially or according to any appropriate function in the direction of the medium M. The first acoustic channel 3 is curved towards the sound pulse generator 2 in such a way that the radiant heat of the medium M on the sound pulse generator 2 is at least greatly reduced. In order to further reduce thermal effects the first acoustic channel 3 and also the second acoustic channel 6 are cooled from the outside by means of a cooling device 11. The cooling device might be a fan providing cooled air or might be a cooling reservoir arranged around the acoustic channels 3, 6 comprising a cooling fluid. The second acoustic channel 6 further comprises a temperature protection diaphragm 61 arranged in front of the first microphone 7 in the direction of a running direction LR of the acoustic pulse AP. The temperature protection diaphragm 61 is adapted to transmit the acoustic pulse AP but hamper heat radiation to penetrate the diaphragm 61. The transmitter 4 comprises on its side 41 facing the medium M to be measured an interfering element 42 (see FIG. 2) which reflects a part RI of the acoustic pulse AP back to the first acoustic channel 3 of the first transmitter arrangement TA1, in which a second microphone 8, preferably arranged on the side 43 of the transmitter 4 facing the sound pulse generator 2, is arranged for detecting the back-reflected part RI of the acoustic pulse AP (not shown in FIG. 1, for detail see FIG. 2). The device 1 further comprising a pulse discriminator 9 designed to determine the arrival times AT of the recorded acoustic pulses AP in a suitable way and to transmit them to an evaluation unit 10 designed to determine the temperature of the medium M from the runtime of the acoustic pulse AP from the transmitter 4 to the receiver 5, taking into account the arrival times AT determined by the pulse discriminator and the acoustic pulses RI, AI detected by first and second microphones 7, 8.

Figure 2:
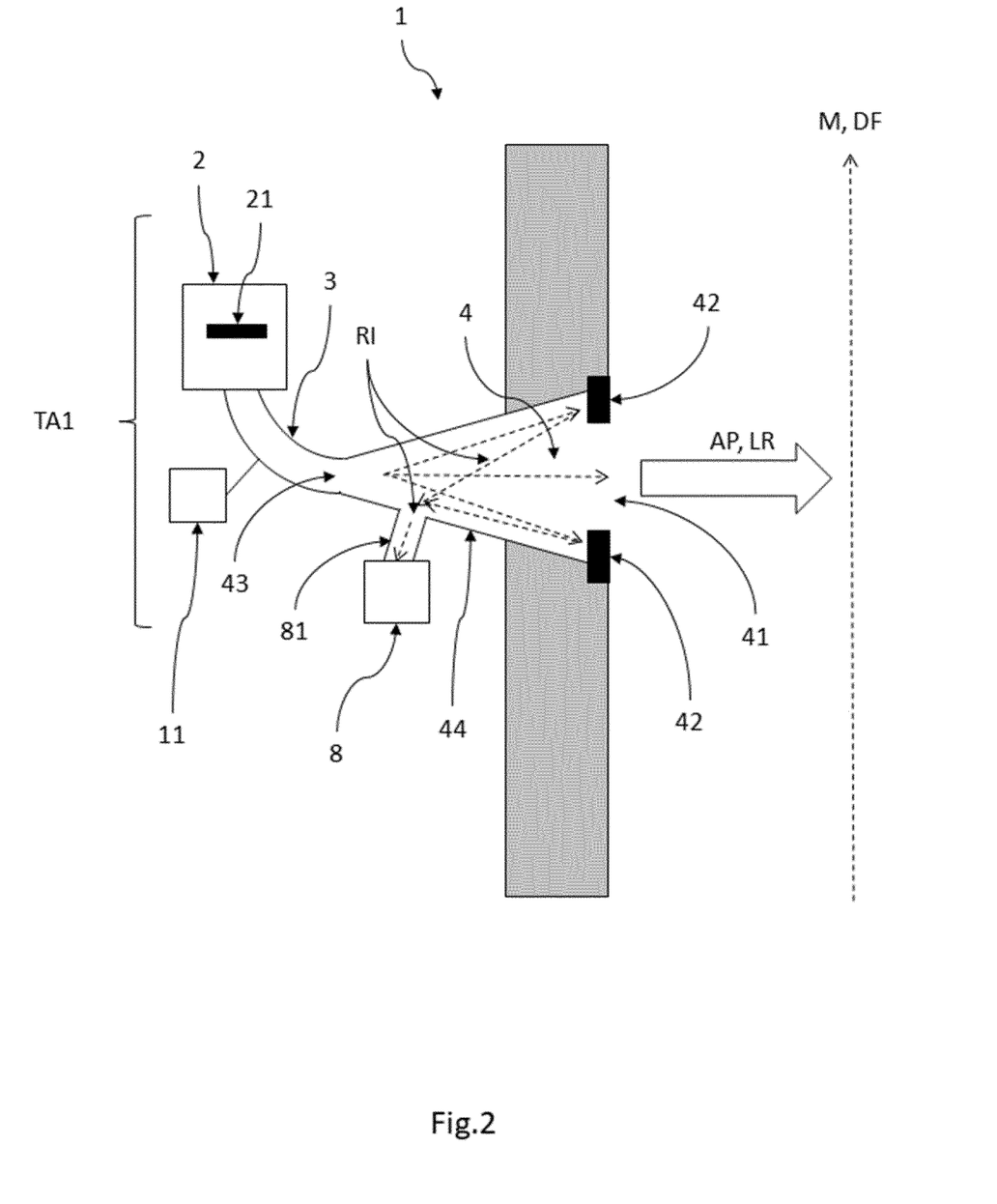
FIG. 2: schematic side view of another embodiment of a device for acoustic temperature measurement according to the present invention installed in an installation for cement production.

FIG. 2 shows a schematic side view of the device for acoustic temperature measurement according to the present invention installed in an installation 100 for cement production as shown in FIG. 1 with the interfering element 42 in more details. The transmitter 4 comprises on its side 41 facing the medium M to be measured an interfering element 42 which reflects a part RI of the acoustic pulse AP back to the first acoustic channel 3 of the first transmitter arrangement TA1, in which a second microphone 8 is arranged on the side 43 of the transmitter 4 facing the sound pulse generator 2 for detecting the back-reflected part RI of the acoustic pulse AP. The second microphone 8 is arranged outside the transmitter 4 and is connected to a wall 44 of the transmitter 4 by means of an acoustic supply line 81 for detection of the back-reflected part RI of the acoustic pulse AP. The acoustic supply line serves as a temperature protection for the second microphone 8. Here, the interfering element 42 is configured as a ring around the output 41 of the transmitter 4.

Figure 3:
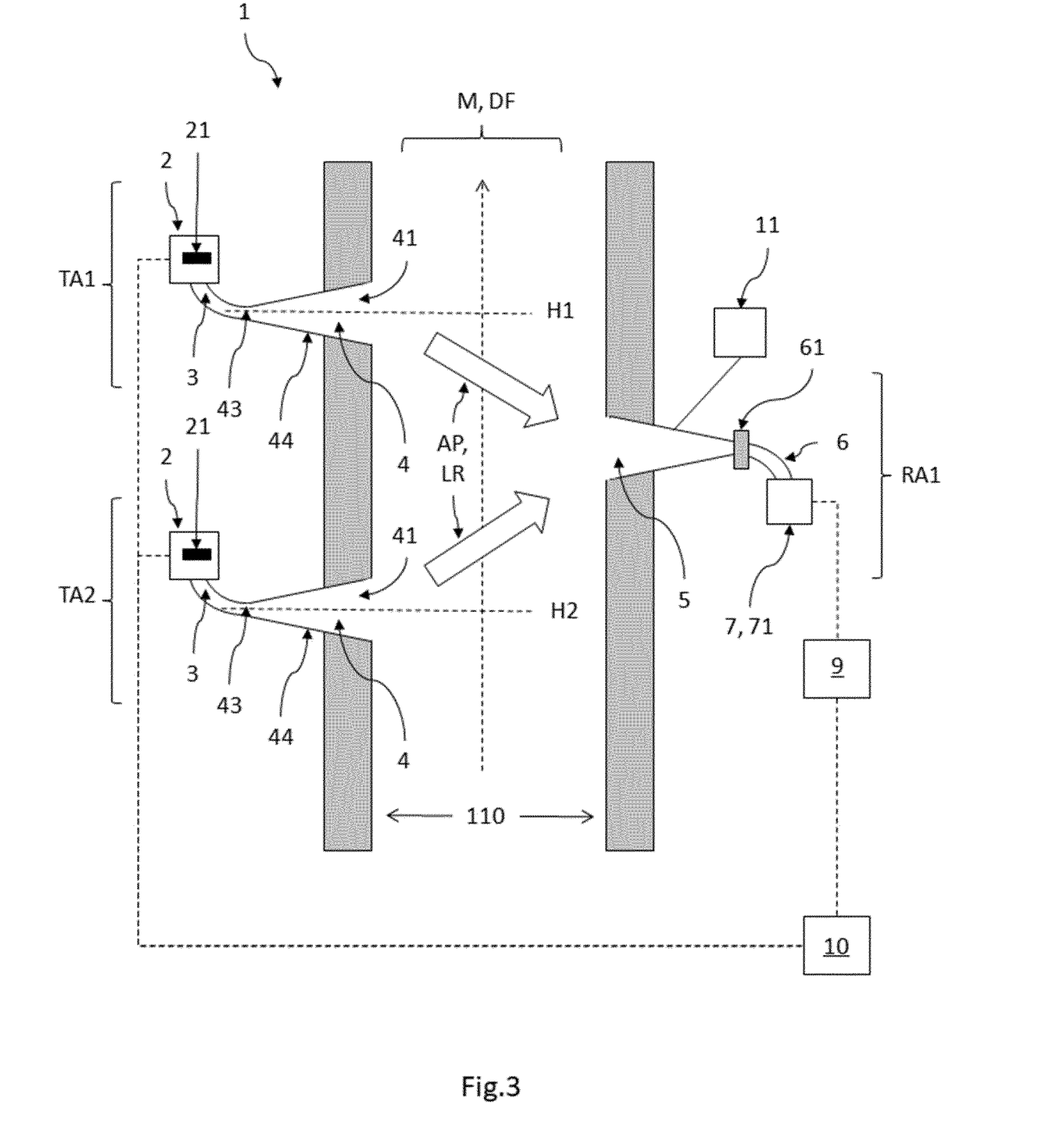
FIG. 3: schematic side view of another embodiment of a device for acoustic temperature and gas flow measurements according to the present invention installed in an installation for cement production using two transmitter arrangements and one receiver arrangement.

FIG. 3 shows a schematic side view of another embodiment of a device 1 for acoustic temperature and gas flow measurements according to the present invention installed in an installation 100 for cement production using two transmitter arrangements and one receiver arrangement. The device 1 comprises in addition to the first transmitter arrangement TA1 a second transmitter arrangement TA2 comprising the same components as the first transmitter arrangement TA1, where first and second transmitter arrangements TA1, TA2 are arranged on the same side of the medium channel 110 at different heights H1, H2 with respect to a direction of flow DF of the gaseous medium M, where one of the first and second transmitter arrangements TA1, TA2 is arranged above the first receiver arrangement RA1 and the other is arranged below the first receiver arrangement RA1 with respect to the direction of flow DF of the gaseous medium M, where both transmitter arrangements TA1, TA2 are adapted to transmit their acoustic pulses AP towards the receiver 5 at different times in order to provide acoustic pulses AP with runtimes in one direction partly against and in the other direction partly along the direction of flow DF of the gaseous medium M. Again the first and second transmitter arrangements TA1, TA2 and the first receiver arrangement RA1 are arranged on opposite sides of the medium channel 110. The transmitter arrangements TA1, TA2 can be adjusted to emit the acoustic pulse AP directly towards the receiver arrangement RA1 by slightly tilting the transmitter arrangements TA1, TA2 by a certain angle adapted to the difference between first and second heights H1, H2.

Figure 4:
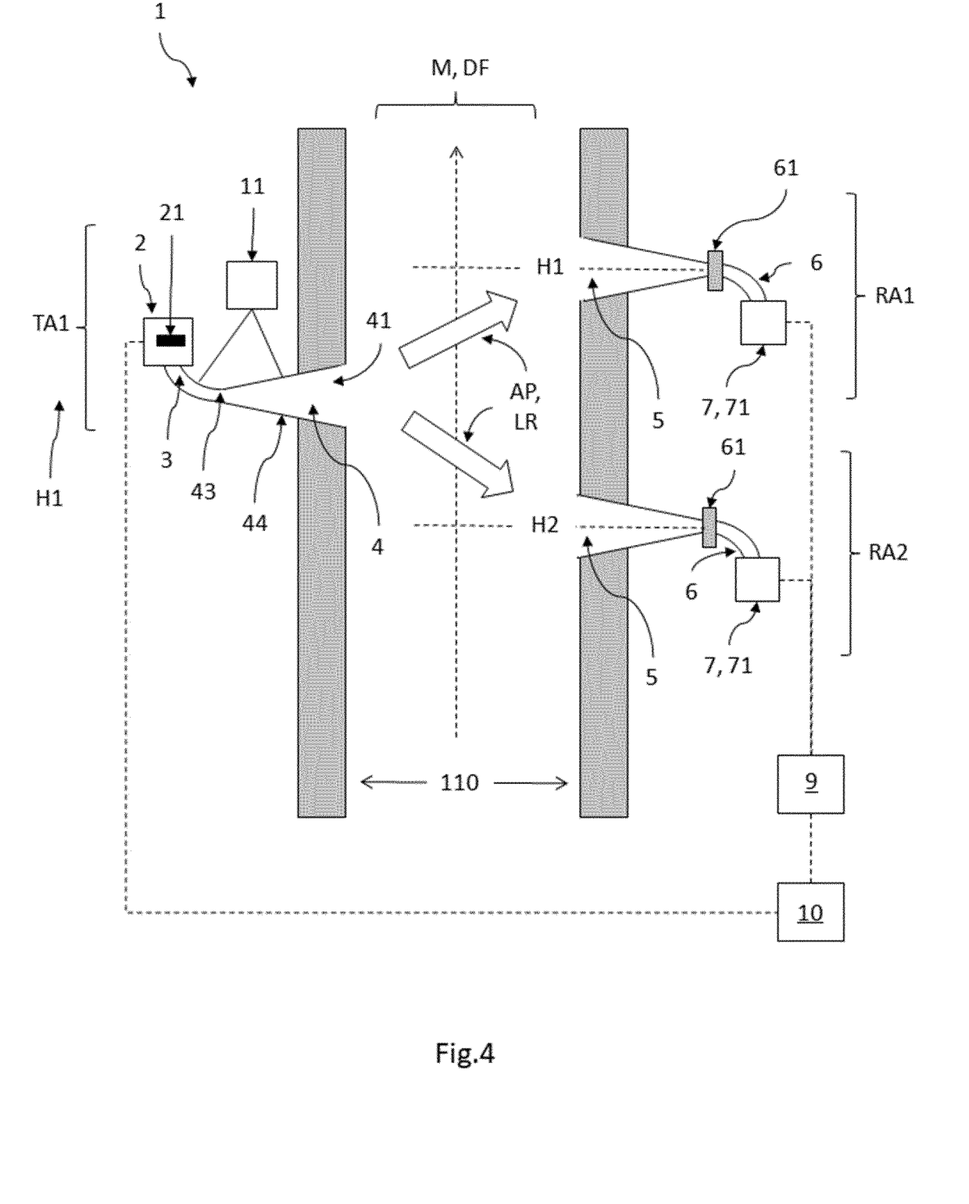
FIG. 4: schematic side view of another embodiment of a device for acoustic temperature and gas flow measurements according to the present invention installed in an installation for cement production using one transmitter arrangement and two receiver arrangements.

FIG. 4 shows a schematic side view of another embodiment of a device for acoustic temperature and gas flow measurements according to the present invention installed in an installation for cement production using one transmitter arrangement and two receiver arrangements. The device 1 comprises at least a second receiver arrangement RA2 comprising the same components as the first receiver arrangement RA1, where first and second receiver arrangements RA1, RA2 are arranged on the same side of the medium channel 110 at different heights H1, H2 with respect to the direction of flow DF of the gaseous medium M, where one of the first and second receiver arrangements RA1, RA2 are arranged above the first transmitter arrangement TA1 and the other is arranged below the first receiver arrangement RA1 with respect to the direction of flow DF of the gaseous medium M, where both receiver arrangements RA1, RA2 are adapted to receive the acoustic pulse AP from the transmitter 4 at different times, where the transmitter 4 is adapted to transmit the acoustic pulses AP to the first and/or second receiver arrangement RA1, RA2 in order to provide acoustic pulses AP with runtimes in one direction partly against and in the other direction partly along the direction of flow DF of the gaseous medium M. Again the first transmitter arrangement TA1 and the first and second receiver arrangements RA1, RA2 are arranged on opposite sides of the medium channel 110. The receiver arrangements RA1, RA2 can be adjusted to receive the acoustic pulse AP directly from the transmitter arrangement TA1 by slightly tilting the receiver arrangements RA1, RA2 by a certain angle adapted to the difference between first and second heights H1, H2.

Figure 5:
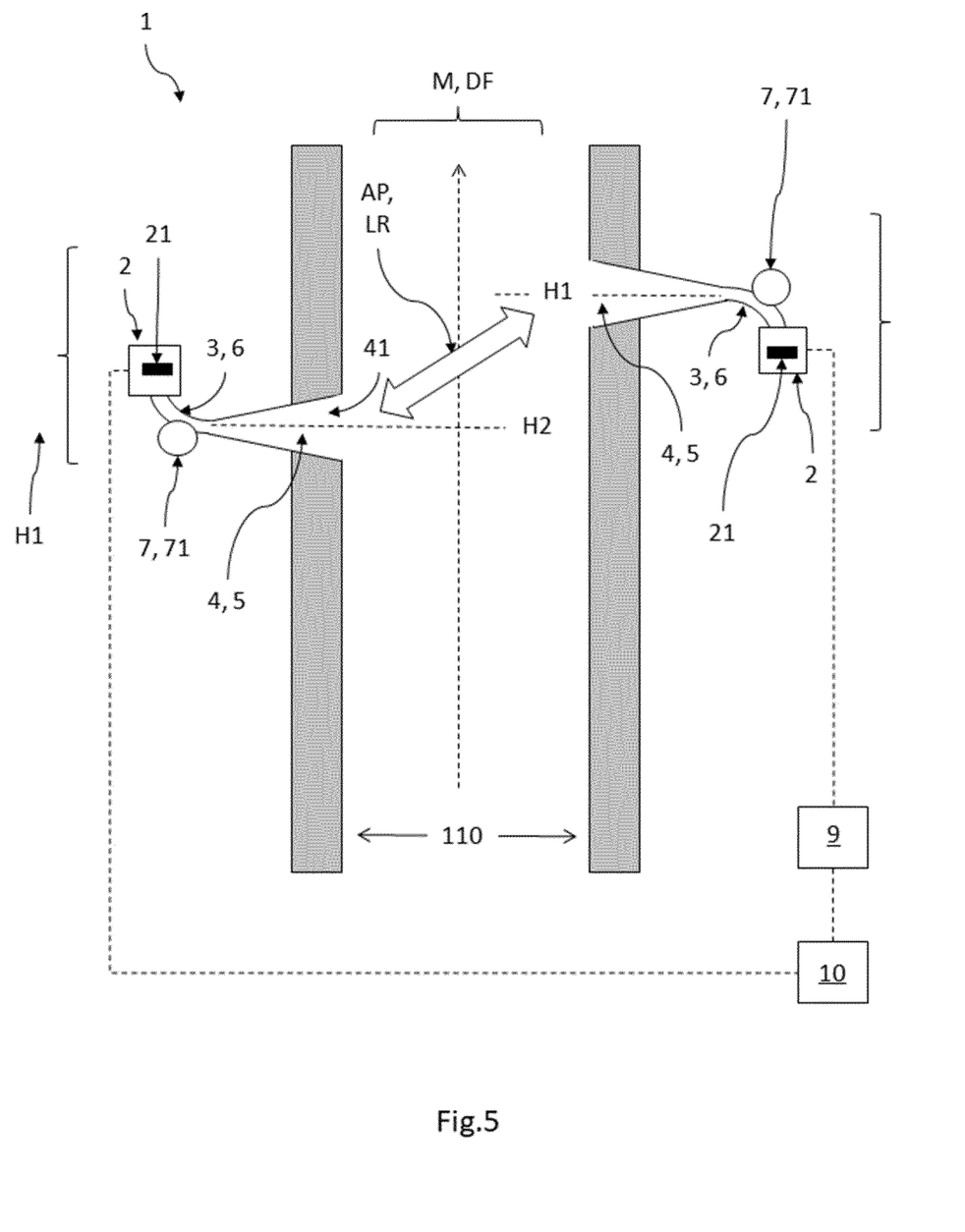
FIG. 5: schematic side view of another embodiment of a device for acoustic temperature and gas flow measurements according to the present invention installed in an installation for cement production using integrated transmitter and receiver arrangement on both sides of the medium channel.

FIG. 5 shows a schematic side view of another embodiment of a device for acoustic temperature and gas flow measurements according to the present invention installed in an installation for cement production using integrated transmitter and receiver arrangement on both sides of the medium channel. The first transmitter arrangement TA1 is adapted to be operated on demand as a second receiver arrangement RA2 comprising the same components as the first receiver arrangement RA1 required to also receive the acoustic pulse AP and that the first receiver arrangement RA1 is adapted to be operated on demand as a second transmitter arrangement TA2 comprising the same components as the first transmitter arrangement TA1 required to also transmit the acoustic pulse AP, where the first transmitter and receiver arrangement are arranged on different heights with respect to the direction of flow DF of the gaseous medium M, where the first transmitter arrangement TA1 is adapted to transmit acoustic pulses AP at different times than the second transmitter arrangements TA2 in order to provide acoustic pulses AP with runtimes in one direction partly against and in the other direction partly along the direction of flow DF of the gaseous medium M. Again the first transmitter arrangement TA1 and the first receiver arrangement RA1 as well as the second transmitter arrangement TA2 and the second receiver arrangement RA2 are arranged on opposite sides of the medium channel 110. The transmitter receiver arrangement TA1, RA2 can be adjusted to emit or receive the acoustic pulse AP directly towards or from the receiver transmitter arrangement RA1, TA2 by slightly tilting the transmitter receiver arrangements TA1, RA2 and RA1, TA2 by a certain angle adapted to the difference between first and second heights H1, H2.

Figure 6:
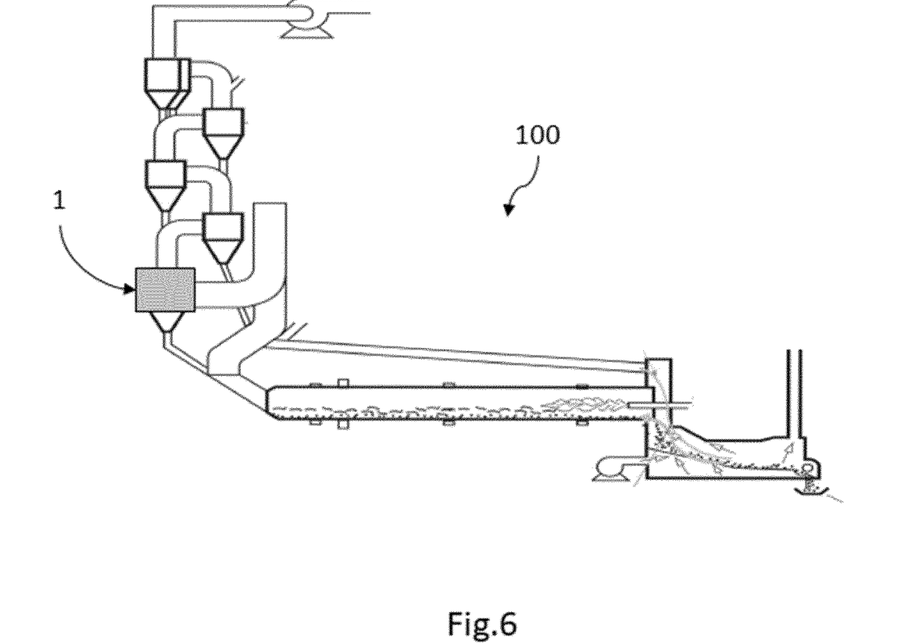
FIG. 6: schematic view of an installation for cement production according to the present invention comprising a device for acoustic temperature and/or gas flow measurements according to the present invention.

FIG. 6 shows a schematic view of an installation 100 for cement production according to the present invention comprising a device 1 for acoustic temperature and/or gas flow measurements according to the present invention. During cement production, the use of continuously measuring measurement and analysis equipment such as the device 1 according to the present invention is necessary at many points. With the help of the measurements, the function and efficiency of the plant operation is to be ensured with the aim of energy saving and quality monitoring. A further aspect is the safety of persons and plants by monitoring the explosion or fire hazard, e.g. at the electrostatic precipitator and at the coal silo. In order to fulfill the legal requirements with regard to environmental protection and the associated compliance with the permissible limit values, the plants used for flue gas cleaning are checked and the residual concentrations of pollutants in the flue gas are monitored. The extremely difficult environmental conditions in the rotary kiln place the highest demands on today's extraction techniques. Gas temperatures up to 1500° C., dust concentrations up to 2000 g/m3 and high alkali, sulphate and chloride contents are typical for the environment of the rotary kiln. Inside the rotary kiln, it is very difficult to measure the gas temperature using standard industrial methods according to the state of the art. If the temperature of the secondary and primary air is known very inaccurately, the combustion capacity of the two burners tends to be set too high to reach the required process temperatures. In Germany and Europe the typical production capacity of cement rotary kilns is approx. 3000 tons per day. The thermal energy requirement is given as approx. 3200 kJ/kg clinker, corresponding to a net thermal output of 111 MW, which must be applied via the primary burner and the calciner. Due to losses, fluctuations in raw material quality and humidity and the fact that the temperatures of the gas streams involved are not known exactly, the thermal output of the primary burner and the calciner has to be 111 MW; the actual combustion capacity is up to 150 MW. With the device for temperature and enthalpy measurement according to the present invention, it is possible to reduce the specific energy requirement in clinker production and to achieve this by specifically adjusting the gas temperatures. At air temperatures of around 1000° C., for example an energy change of 100 kJ per m$^3$ corresponds to a temperature change of approx. 80 K. In order to be able to regulate the temperature accurately, the device is therefore required for temperature measurement according to the invention at hand. This exact temperature measurement can also be used at, but not limited to the inlet area of the clinker cooler, the tertiary air duct, possibly also the exhaust air duct, the downcomer and the calciner. Due to the low heat capacity of gases and the high flow rates, reaction times in the range of minutes or less, this is only possible by the present invention. In addition to improving energy efficiency, fast and accurate temperature measurement plays a key role in reducing nitrogen oxides in the heat exchanger tower. The SNCR process (selective non-catalytic reduction), which is widely used, requires a temperature window of 850 to 900° C. to optimize the process when injecting the reducing agent.

Figure 7:
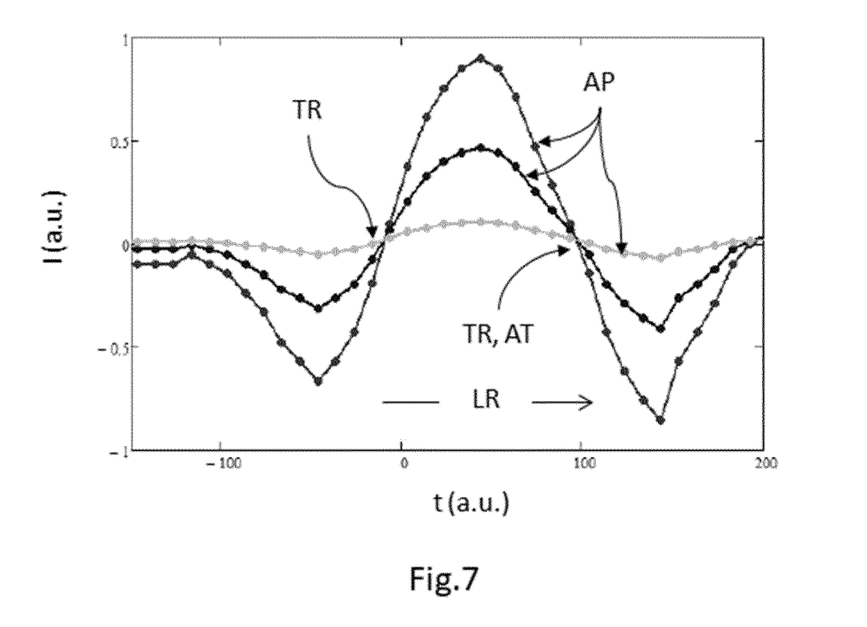
FIG. 7: a diagram of an acoustic pulse as a function of runtime for three different acoustic pulses.

FIG. 7 shows a diagram of intensity I of an acoustic pulse AP as a function of runtime t for three different acoustic pulses AP after analysis of the pulse discriminator 9 with a sampling rate of 200 kHz corresponding to 5 µs between two neighbored sample pints. The pulse discriminator 9 (see FIGS. 1, 3,-5) is adapted to use a zero crossing of the acoustic pulse AP as a trigger time TP for the arrival time AT of the acoustic pulse AP. The trigger time TR (trigger point) can be obtained by interpolation between sample points around the trigger time TR. As the acoustic pulse AP passes through the measuring distance, it is attenuated in an unpredictable manner when the dust load fluctuates and when gas strands occur. The arrival AT of a pulse is determined at the time when it exceeds a specified threshold. If the pulse AP were not normalized, an unattenuated pulse AP would exceed the measurement threshold at an earlier arrival time AT than for an attenuated pulse, which would falsify the arrival time AT. By detecting the trigger time TR instead of evaluating a measurement threshold, the derived arrival time AT becomes independent of the intensity I of the acoustic pulse AP and therefore independent of the dust load of the medium, which greatly increases the measurement accuracy. For examples, in gases of 1450° C. a measurement accuracy of 1K is achieved corresponding to an accuracy of the runtime measurement of less than 2 µs.

Figure 8:
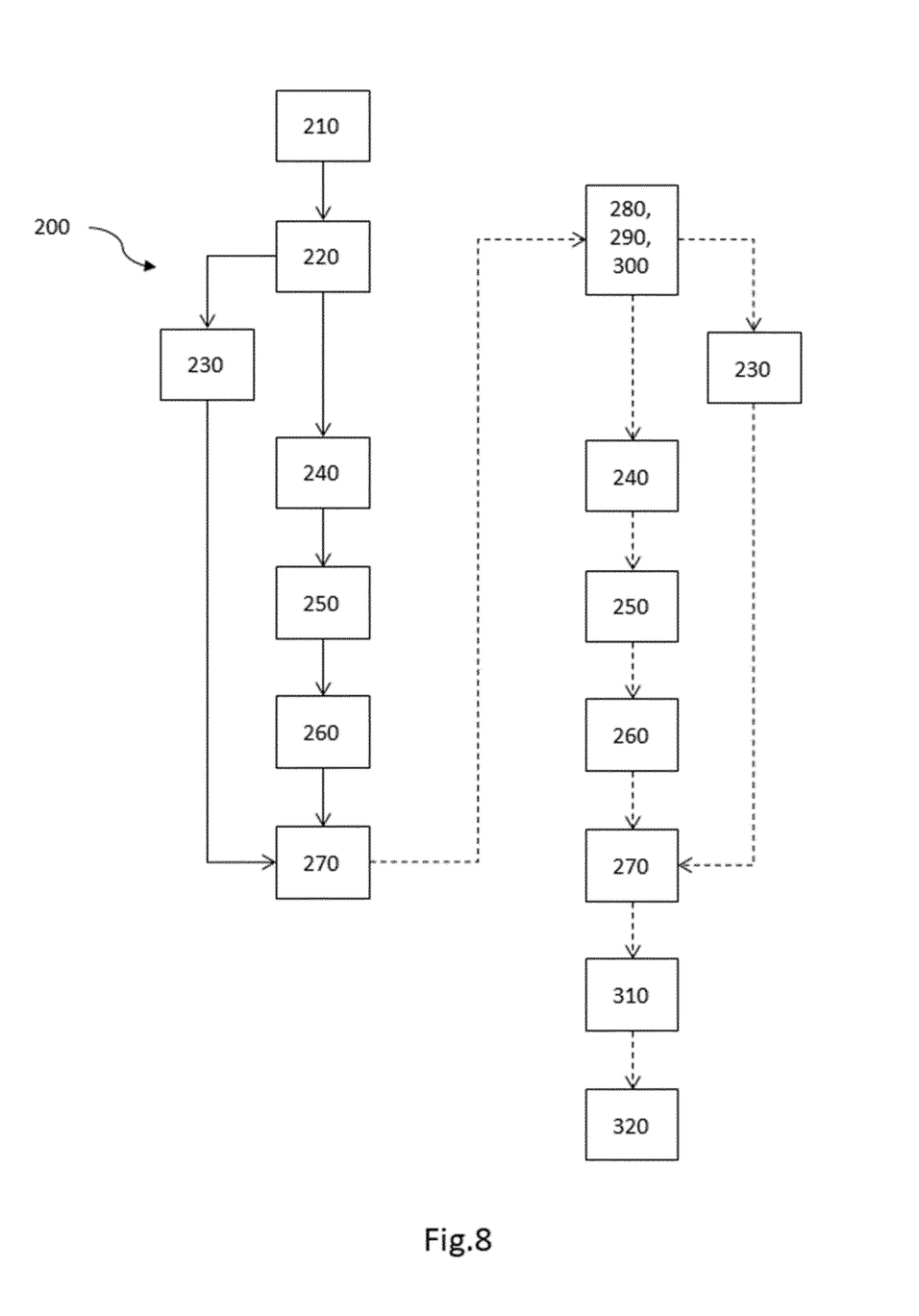
FIG. 8: an embodiment of a method for acoustic temperature and gas flow measurements according to the present invention.

FIG. 8 shows an embodiment of a method 100 for acoustic temperature and gas flow measurements according to the present invention to operate a device 1 according to the present invention at least for an acoustic temperature measurement in a gaseous medium passing a medium channel 110 by means of runtime measurement of an acoustic pulse AP running through the gaseous medium M from at least a first transmitter arrangement TA1 arranged on one side of a medium channel 110 to at least a first receiver arrangement RA1 arranged on another side of the medium channel 110, comprising steps of generating 210 the acoustic pulse AP by a sound pulse generator 2; transmitting 220 the acoustic pulse AP via a connected first acoustic channel 3 to a transmitter 4, which transmits the acoustic pulse AP into the medium M, where the first acoustic channel 3 being of acoustically dispersive design and being curved towards the sound pulse generator 2 in such a way that the radiant heat of the medium M on the sound pulse generator 2 is at least greatly reduced; detecting 230 a back-reflected part RI of the acoustic pulse AP by a second microphone arranged in the first transmitter arrangement TA1, preferably arranged on the side 43 of the transmitter 4 facing the sound pulse generator 2, in parallel to the acoustic pulse AP transmitted to the receiver 5, wherein at least the transmitter 4 comprises on its side 41 facing the medium M to be measured an interfering element 42 to reflect back the part RI of the acoustic pulse AP to the first acoustic channel 3; receiving 240 the acoustic pulse AP after having passed the medium M by a receiver 5; transmitting 250 the acoustic pulse AP via a second acoustic channel 6 to a first microphone 7, preferably a piezoelectric microphone 7, to detect the acoustic pulse AP; determining 260 an arrival time AT of the recorded acoustic pulses AP by a pulse discriminator 9 in a suitable way and transmitting them to an evaluation unit 10; and determining 270 the temperature of the medium M from the runtime of the acoustic pulse AP from the transmitter 4 to the receiver 5 by the evaluation unit 10 taking into account the arrival times AT determined by the pulse discriminator 9 and the acoustic pulses RI, AI detected by first and second microphones 7, 8.

In case of the device 1 comprises at least a second transmitter arrangement TA2 comprising the same components as the first transmitter arrangement TA1, where first and second transmitter arrangements TA1, TA2 are arranged on the same side of the medium channel 110 at different heights H1, H2 with respect to a direction of flow DF of the gaseous medium M, where one of the first and second transmitter arrangements TA1, TA2 is arranged above the first receiver arrangement RA1 and the other is arranged below the first receiver arrangement RA1 with respect to the direction of flow DF of the gaseous medium M, the method 100 comprises the step of generating and transmitting 280 acoustic pulses AP towards the receiver 5 at different times by both transmitter arrangements TA1, TA2.

In case of device 1 comprises at least a second receiver arrangement RA2 comprising the same components as the first receiver arrangement RA1, where first and second receiver arrangements RA1, RA2 are arranged on the same side of the medium channel 110 at different heights H1, H2 with respect to the direction of flow DF of the gaseous medium M, where one of the first and second receiver arrangements RA1, RA2 are arranged above the first transmitter arrangement TA1 and the other is arranged below the first receiver arrangement RA1 with respect to the direction of flow DF of the gaseous medium M, the method 100 comprises the steps of generating transmitting 290 the acoustic pulses AP by the transmitter 4 either to the first or second receiver arrangement RA1, RA2 and receiving the acoustic pulse AP from the transmitter 4 at different times by both receiver arrangements RA1, RA2.

In case of the first transmitter arrangement TA1 is adapted to be operated on demand as a second receiver arrangement RA2 comprising the same components as the first receiver arrangement RA1 required to also receive the acoustic pulse AP and that the first receiver arrangement RA1 is adapted to be operated on demand as a second transmitter arrangement TA2 comprising the same components as the first transmitter arrangement TA1 required to also transmit the acoustic pulse AP, where the first transmitter and receiver arrangement are arranged on different heights with respect to the direction of flow DF of the gaseous medium M, the method 100 comprises the step 300 of generating and transmitting acoustic pulses from both transmitters TA1, TA2 to both receivers RA1, RA2 at different times.

In all three previous cases the method 100 comprises the further steps of calculating 310 a volume flow of the gaseous medium M through the medium channel 110 from a difference of both detected runtimes one partly against and one partly along the direction of flow DF of the gaseous medium M by the evaluation unit 10 followed by calculating 320 a gas enthalpy from the temperature and volume flow by the evaluation unit 10.

The embodiments shown here are only examples of the present invention and must therefore not be understood as restrictive. Alternative embodiments considered by skilled people are equally covered by the scope of protection of the present invention.

LIST OF REFERENCE NUMERALS 1 invented device for acoustic temperature measurement
2 sound pulse generator
21 metal diaphragm
3 first acoustic channel that is acoustically dispersive
4 transmitter
41 side of the transmitter facing to the medium
42 interference element in the transmitter
43 side of the transmitter facing to the sound pulse generator
44 wall of the transmitter
5 receiver
6 second acoustic channel
61 temperature protection diaphragm
7 first microphone
71 microphone amplifier
8 second microphone
81 acoustic supply line to second microphone
9 pulse discriminator
10 evaluation unit
11 cooling device at least for the first acoustic channel
100 installation for cement production
110 medium channel
200 A method to operate a device according to the present invention
210 generating the acoustic pulse by a sound pulse generator
220 transmitting the acoustic pulse via a connected a first acoustic channel to a transmitter
230 detecting a back-reflected part of the acoustic pulse by a second microphone
240 receiving the acoustic pulse after having passed the medium by a receiver 250 transmitting the acoustic pulse via a second acoustic channel to a first microphone
260 determining a arrival time of the recorded acoustic pulses by a pulse discriminator
270 determining the temperature of the medium
280 transmitting acoustic pulses towards the receiver at different times by both transmitter arrangements (first and second)
290 transmitting the acoustic pulses by the transmitter either to the first or second receiver arrangement and receiving the acoustic pulse from the transmitter at different times by both receiver arrangements
300 transmitting the acoustic pulses from both transmitter to both receivers at different times
310 calculating a volume flow of the gaseous medium through the medium channel from a difference of both detected runtimes
320 calculating a gas enthalpy from the temperature and volume flow by the evaluation unit
AP acoustic pulse
DF direction of flow of the gaseous medium
H1 installation height of the first transmitter or receiver arrangement on the medium channel
H2 installation height of the second transmitter or receiver arrangement on the medium channel
LR direction of acoustic pulse travel
M gaseous medium, the temperature of which must be determined
RA1 first receiver arrangement
RA2 second receiver arrangement
RI part of the acoustic pulse reflected back by the interfering element
RT arrival time of the acoustic pulse
TA1 first transmitter arrangement
TA2 first transmitter arrangement
TR trigger time

The invention claimed is:

1. A device for an acoustic temperature measurement in a gaseous medium passing a medium channel by means of runtime measurement of an acoustic pulse running through the gaseous medium from at least a first transmitter arrangement to at least a first receiver arrangement,
the first transmitter arrangement comprising a sound pulse generator for generating the acoustic pulse, which is connected by a first acoustic channel to a transmitter which transmits the acoustic pulse into the medium, the first acoustic channel being of acoustically dispersive design, and, the first receiver arrangement comprising a receiver for receiving the acoustic pulse after it has passed through the medium and for transmitting it via a second acoustic channel to a first microphone for detecting the acoustic pulse, the first acoustic channel being curved towards the sound pulse generator in such a way that the radiant heat of the medium on the sound pulse generator is at least greatly reduced,
wherein at least the transmitter comprises on its side facing the medium to be measured an interfering element which is configured as a ring or an appropriate shape around the output of the transmitter and reflects a part of the acoustic pulse back to the first acoustic channel of the first transmitter arrangement, in which a second microphone is arranged for detecting the back-reflected part of the acoustic pulse, the device further comprising a pulse discriminator designed to determine the arrival times of the recorded acoustic pulses in a suitable way and to transmit them to an evaluation unit designed to determine the temperature of the medium from the runtime of the acoustic pulse from the transmitter to the receiver, taking into account the arrival times determined by the pulse discriminator and the acoustic pulses detected by first and second microphones.

2. The device according to claim 1, wherein at least the first acoustic channel and also the second acoustic channel are cooled from the outside by means of a cooling device.

3. The device according to claim 1, wherein the transmitters and receivers are designed as funnels which open linearly, exponentially or according to any appropriate function in the direction of the medium.

4. The device according to claim 1, wherein the sound pulse generator comprises a correspondingly controlled conductive and elastic metal diaphragm for generating the acoustic pulse or is designed as a pressure chamber loudspeaker or another device to produce short high pressure pulses.

5. The device according to claim 1, wherein in the second acoustic channel a temperature protection diaphragm is arranged in front of the first microphone in the direction of a running direction of the acoustic pulse.

6. The device according to claim 1, wherein the second microphone is arranged outside the transmitter and is connected to a wall of the transmitter by means of an acoustic supply line for detection of the back-reflected part of the acoustic pulse.

7. The device according to claim 1, wherein the pulse discriminator is adapted to use a zero crossing of the acoustic pulse as a trigger time for the arrival time of the acoustic pulse.

8. The device according to claim 1, wherein the first transmitter arrangement and the first receiver arrangement are arranged on opposite sides of a path of interest through the medium channel or of the medium channel.

9. The device according to claim 1, wherein the device comprises at least a second transmitter arrangement comprising the same components as the first transmitter arrangement, where first and second transmitter arrangements are arranged on the same side of the medium channel at different heights with respect to a direction of flow of the gaseous medium, where one of the first and second transmitter arrangements is arranged above the first receiver arrangement and the other is arranged below the first receiver arrangement with respect to the direction of flow of the gaseous medium, where both transmitter arrangements are adapted to transmit their acoustic pulses towards the receiver at different times in order to provide acoustic pulses with runtimes in one direction partly against and in the other direction partly along the direction of flow of the gaseous medium.

10. The device according to claim 1, wherein the device comprises at least a second receiver arrangement comprising the same components as the first receiver arrangement, where first and second receiver arrangements are arranged on the same side of the medium channel at different heights with respect to the direction of flow of the gaseous medium, where one of the first and second receiver arrangements is arranged above the first transmitter arrangement and the other is arranged below the first receiver arrangement with respect to the direction of flow of the gaseous medium, where both receiver arrangements are adapted to receive the acoustic pulse from the transmitter at different times, where the transmitter is adapted to transmit the acoustic pulses to the first and/or second receiver arrangement in order to provide acoustic pulses with runtimes in one direction partly against and in the other direction partly along the direction of flow of the gaseous medium.

11. The device according to claim 1, wherein the first transmitter arrangement is adapted to be operated on demand as a second receiver arrangement comprising the same components as the first receiver arrangement required to also receive the acoustic pulse and that the first receiver arrangement is adapted to be operated on demand as a second transmitter arrangement comprising the same components as the first transmitter arrangement required to also transmit the acoustic pulse, where the first transmitter and receiver arrangement are arranged on different heights with respect to the direction of flow of the gaseous medium, where the first transmitter arrangement is adapted to transmit acoustic pulses at different times than the second transmitter arrangements in order to provide acoustic pulses with runtimes in one direction partly against and in the other direction partly along the direction of flow of the gaseous medium.

12. An installation for cement production comprising at least one device as claimed in claim 1.

13. A method to operate a device according to claim 1 for an acoustic temperature measurement in a gaseous medium passing a medium channel by means of runtime measurement of an acoustic pulse running through the gaseous medium from at least a first transmitter arrangement arranged on one side of a medium channel to at least a first receiver arrangement arranged on another side of the medium channel, comprising steps of:
- generating the acoustic pulse by a sound pulse generator;
- transmitting the acoustic pulse via a connected first acoustic channel to a transmitter, which transmits the acoustic pulse into the medium, where the first acoustic channel being of acoustically dispersive design and being curved towards the sound pulse generator in such a way that the radiant heat of the medium on the sound pulse generator is at least greatly reduced;
- detecting a back-reflected part of the acoustic pulse by a second microphone arranged in the first transmitter arrangement, wherein at least the transmitter comprises on its side facing the medium to be measured an interfering element, which is configured as a ring or an appropriate shape around the output of the transmitter, to reflect back the part of the acoustic pulse to the first acoustic channel;
- receiving the acoustic pulse after having passed the medium by a receiver;
- transmitting the acoustic pulse via a second acoustic channel to a first microphone to detect the acoustic pulse;
- determining a arrival time of the recorded acoustic pulses by a pulse discriminator in a suitable way and transmitting them to an evaluation unit;
- determining the temperature of the medium from the runtime of the acoustic pulse from the transmitter to the receiver by the evaluation unit taking into account the arrival times determined by the pulse discriminator and the acoustic pulses detected by first and second microphones; and,
- determining the runtime inside of the transmitter and receiver by means of measurement of the runtime of the back reflected part of the pulse by the interfering elements at the output of the transmitter.

14. The method according to claim 13, wherein the device comprises
- a second transmitter arrangement comprising the same components as the first transmitter arrangement, where first and second transmitter arrangements are arranged on the same side of the medium channel at different heights with respect to a direction of flow of the gaseous medium, where one of the first and second transmitter arrangements is arranged above the first receiver arrangement and the other is arranged below the first receiver arrangement with respect to the direction of flow of the gaseous medium, comprising the step of generating and transmitting acoustic pulses towards the receiver at different times by both transmitter arrangements, and/or
- a second receiver arrangement comprising the same components as the first receiver arrangement, where first and second receiver arrangements are arranged on the same side of the medium channel at different heights with respect to the direction of flow of the gaseous medium, where one of the first and second receiver arrangements are arranged above the first transmitter arrangement and the other is arranged below the first receiver arrangement with respect to the direction of flow of the gaseous medium comprising the steps of generating transmitting the acoustic pulses by the transmitter either to the first or second receiver arrangement and receiving the acoustic pulse from the transmitter at different times by both receiver arrangements;

and/or
- the first transmitter arrangement is adapted to be operated on demand as a second receiver arrangement comprising the same components as the first receiver arrangement required to also receive the acoustic pulse and that the first receiver arrangement is adapted to be operated on demand as a second transmitter arrangement comprising the same components as the first transmitter arrangement required to also transmit the acoustic pulse, where the first transmitter and receiver arrangement are arranged on different heights with respect to the direction of flow of the gaseous medium, comprising the step of generating and transmitting acoustic pulses from both transmitters to both receivers at different times; and
- calculating a volume flow of the gaseous medium through the medium channel from a difference of both detected runtimes one partly against and one partly along the direction of flow of the gaseous medium by the evaluation unit.

15. The method according to claim 14, wherein the method steps are followed by calculating a gas enthalpy from the temperature and volume flow by the evaluation unit.

* * * * *